March 28, 1961 R. KRESS 2,976,676
VARIABLE JET NOZZLE WITH COACTING SHROUD
Filed Oct. 27, 1952 4 Sheets-Sheet 1

INVENTOR
RALPH KRESS
BY Strauch, Nolan & Diggins
ATTORNEYS

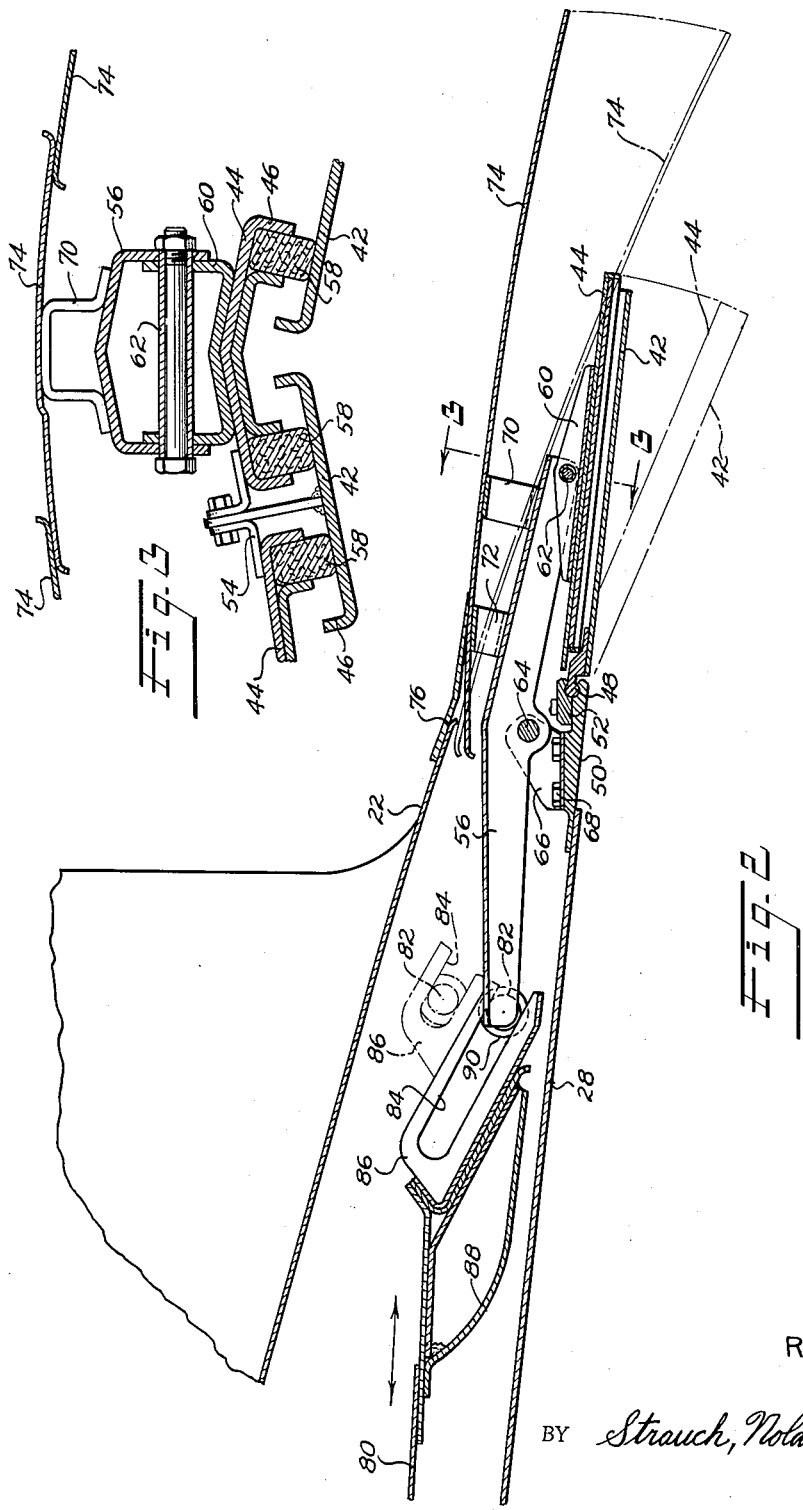

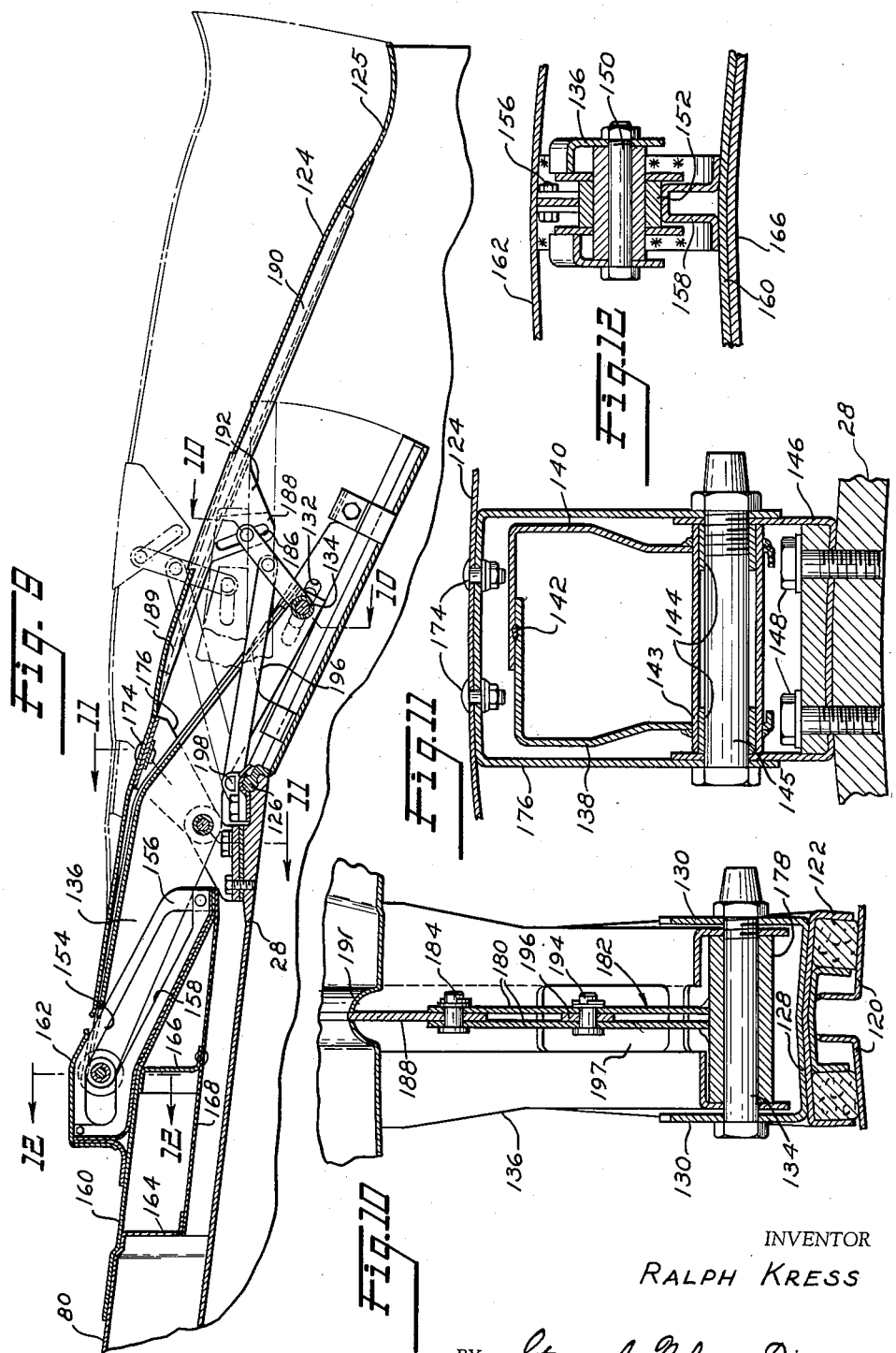

United States Patent Office 2,976,676
Patented Mar. 28, 1961

2,976,676

VARIABLE JET NOZZLE WITH COACTING SHROUD

Ralph Kress, La Mesa, Calif., assignor to Solar Aircraft Company, San Diego, Calif., a corporation of California Filed Oct. 27, 1952, Ser. No. 317,005

25 Claims. (Cl. 60—35.6)

This invention relates to jet power plants and has particular reference to turbojet engines in which a propulsion effect for an aircraft is produced by the ejection of gases at high velocity from the nozzle.

This application is a continuation-in-part of co-pending application Serial No. 238,428 filed July 25, 1951, now abandoned.

The invention is particularly adapted for use in turbojet engines equipped with afterburner units of the type disclosed in co-pending application Serial No. 140,633, filed January 26, 1950, by Robert E. Day, now Patent No. 2,701,444. In this and other types of afterburners it is desirable to vary the size of the jet nozzle opening when the afterburner is in operation. Afterburner combustion increases the volume and temperature of the discharged gases which, in turn, tend to disrupt the normal operating condition of the primary engine unless these increases are broadly compensated for by increasing the size of the jet nozzle.

Certain of the previous jet nozzle constructions, as for example, the nozzles disclosed in co-pending applications Serial No. 59,944, filed November 13, 1948, by Paul A. Pitt et al., now abandoned, and Serial No. 150,127, filed March 17, 1950, by Ralph Kress, now Patent No. 2,865,165, serve very satisfactorily to effect this broad compensation. However, it has been found that nozzles of the above types when closed produce a large stagnation area between the shroud or aft end of the airplane structure and the nozzle orifice, and this has tended to produce a drag of considerably greater magnitude than is experienced with the smooth fairing of the surfaces to the smaller opening of non-afterburning fixed jet nozzle tailpipes.

Numerous variable jet nozzles of the needle valve or bulb type have been offered as a possible solution to the above problem. These nozzles, however, introduce a new and often more serious problem which is that of supporting and cooling the needle or bulb in the extreme high temperatures associated with afterburning. Thus, these temperatures which are frequently in the vicinity of 3000° F. often result in permanent deformation or damage to the supporting and moving parts of nozzles of this type.

To overcome these disadvantages of the jet nozzles of the prior art, this invention provides a continuously variable jet nozzle with a corresponding variable shroud nozzle which may act as the skin of the plane at the jet discharge orifice, whether this be located in the fuselage or in an engine nacelle.

In accordance with the present invention the relationship between the variable jet nozzle and the surrounding variable shroud nozzle is closely controlled through out the range of opening and closing movement to minimize the drag caused by the structure as a whole. Broadly this control is effected in one form of the invention to equalize the pressure on the opposite sides of the trailing edge of the shroud nozzle to eliminate turbulence in this area. The annular column of cooling air flowing between the two nozzles is aspirated by entrainment in the rapidly moving stream issuing from the inner jet engine nozzle. This produces a decrease in pressure at the region adjacent the trailing edge of the shroud nozzle to a point where it is substantially equal to the ambient pressure surrounding the shroud nozzle. By the utilization of the novel apparatus herein disclosed, the desired optimum pressure distribution is maintained in both non-burning or closed and afterburning or open positions as well as transient or otherwise modified conditions between the two extremes.

This not only enables efficient and dependable jet engine operation throughout the entire range of operating conditions, but provides a matching variable shroud in spaced relation thereto which substantially prevents the build up of a stalled air area about the periphery of the jet nozzle, when it is closed. Furthermore, this is accomplished without the aid of internal structure exposed to and tending to impede the flow of the extremely hot gases moving at high velocities.

With these and other considerations in view, it is a prime object of this invention to provide a continuously variable jet nozzle with a corresponding continuously variable shroud nozzle which permits optimum jet engine and jet plane performance over a wide range of operating conditions.

It is a further important object of this invention to provide a continuously variable jet nozzle and continuously variable shroud nozzle wherein variations in the size of one of the nozzles bears a predetermined relation to the variation in the size of the other nozzle in all positions of the nozzles, to provide adequate cooling for all portions of the nozzles with a minimum of turbulence and drag.

Another important object is to provide a smoothly contoured variable shroud nozzle, a shroud cooling air duct, of substantially uniform cross-section, and an inner jet engine nozzle, said shroud nozzle presenting a smooth exterior.

It is an additional object to provide novel means for opening and closing substantially circular jet and shroud nozzles and to effect a predetermined relative movement between corresponding elements of the two nozzles to minimize the overall drag in all nozzle positions.

A further object is to provide a simple operating means to positively and efficiently actuate the variable jet and shroud nozzles in unison at all times.

Other objects and advantages will be apparent from the following description in conjunction with the accompanying drawings and from the appended claims.

The accompanying drawings in which like reference numerals are used to designate similar parts throughout illustrate the preferred embodiments for the purpose of disclosing the invention. The drawings, however, are not to be taken in a limiting or restrictive sense since it will be apparent to those skilled in the art that various changes in the illustrated construction may be resorted to without in any way exceeding the scope of the invention.

In the drawings:

Figure 2 is an enlarged longitudinal section through a portion of the assembly of Figure 1;

Figure 3 is a sectional view taken along line 3—3 of Figure 2;

Figure 9 is an enlarged longitudinal section through a portion of the assembly generally similar to Figure 2 illustrating a modified form of the invention which provides a predetermined differential movement between corresponding elements of the jet and shroud nozzles;

Fig. 10 is a sectional view taken along line 10—10 of Figure 9;

Figure 11 is a sectional view along line 11—11 of Figure 9; and

Figure 12 is a sectional view along line 12—12 of Figure 9.

Figure 1:
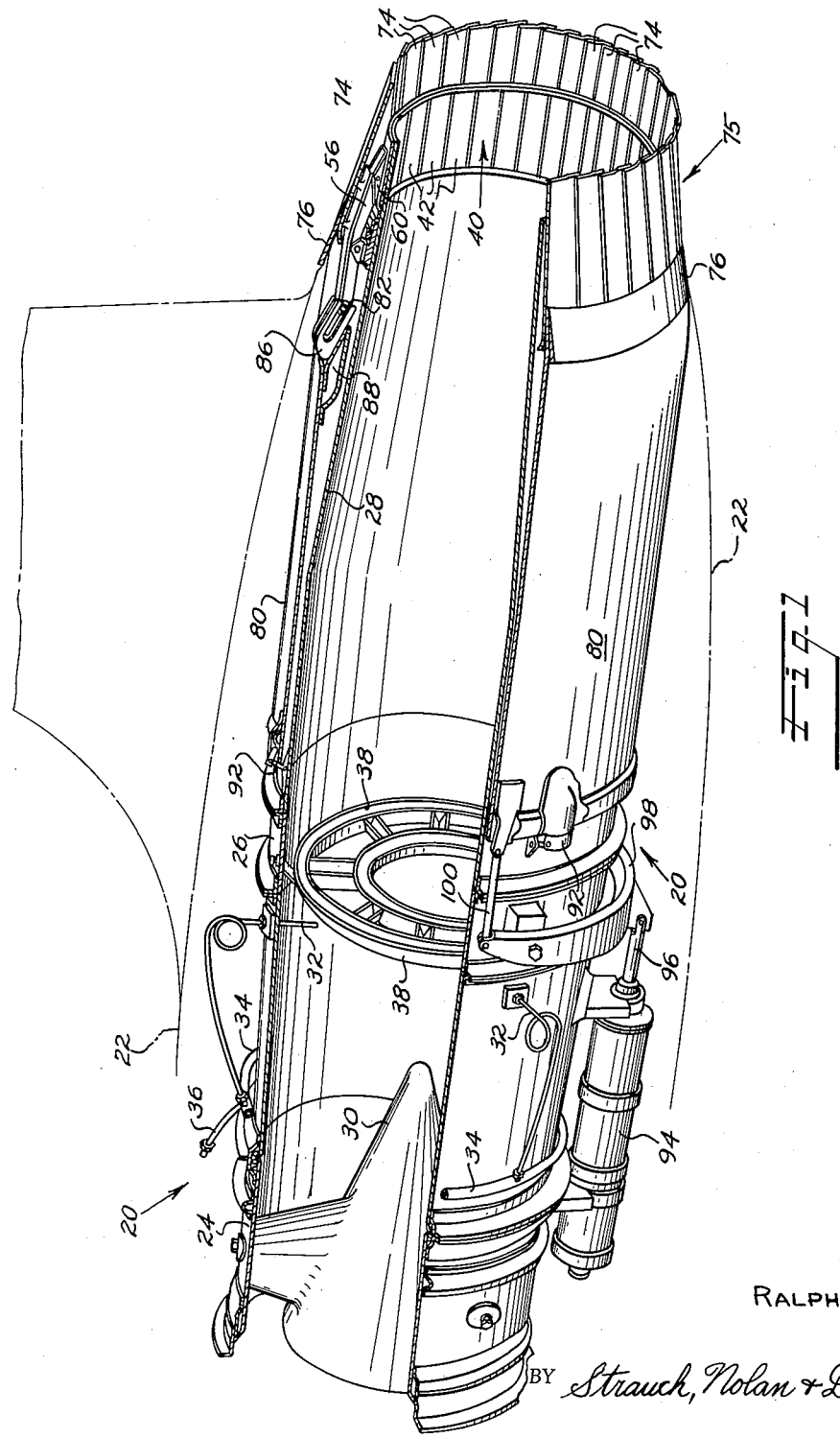
Figure 1 is a perspective view of an afterburner assembly embodying the invention, with a portion broken away to show the details thereof.

Referring now to Figure 1, an afterburner assembly indicated generally at 20 is shown mounted in the tail portion of an aircraft 22 partially indicated by phantom lines.

Afterburner assembly 20 is suitably secured at its forward or upstream end to the primary jet engine, not shown, and comprises generally a diffuser section 24, a burner section 26 and a tailpipe 28.

Mounted in diffuser section 24 is an inner cone 30 which may be of the type disclosed in copending application Serial No. 157,747, filed April 24, 1950, by Joseph B. Greene, now abandoned. The downstream taper of inner cone 30 defines with the outer shell of diffuser section 24 an annular passage of gradually increasing cross-section to properly diffuse the primary engine exhaust gases to a point best suited for optimum afterburning. The burner section 26 may have any suitable type of burner mounted therein. As illustrated, fuel may be injected under pressure into the stream of primary engine exhaust gases by means of fuel conduits 32 extending radially into burner section 26 and connected on the outside of the assembly to an annular feeder pipe 34 which is in turn connected by means of a pipe 36 to the fuel supply, not shown.

The resulting fuel-exhaust gas mixture will in part eddy into some form of sheltered combustion zone and there be ignited to form sheltered pilot flames which will spread combustion to the remainder of the mixture in the usual manner. In the illustrated embodiment a grid 38 of flameholder troughs or gutters forms the sheltered areas and is provided with suitable ignition means, not shown, to initiate combustion in the fuel-gas mixture.

Mounted on the after end of tailpipe 28 is a variable area jet nozzle generally indicated at 40. This variable area nozzle is of the multi-flap type described in detail in my copending application Serial No. 150,127, filed March 17, 1950, now Patent No. 2,865,165, and will therefore be only briefly described herein. Nozzle 40 is comprised of a suitable number of interlocking flaps or channel elements 42 and 44, the channels 42 facing outwardly and the channels 44 facing inwardly as shown in Figure 3. Channels 42 and 44 are formed so that the sides 46 of each channel converge toward the after or downstream end of the channel, whereby the channels are wider at their forward ends than at their downstream ends. This channel formation allows the channel elements 42 and 44 to be simultaneously swung inwardly to decrease the size of the jet nozzle orifice or swung outwardly to increase the size of the nozzle orifice, while at the same time maintaining a substantially circular orifice for any channel position.

Channels 42 and 44 are hinged to tailpipe 28 by means of hinge pins 48, Figure 2, which are secured to each outwardly facing channel 42 and rotate in sockets formed by grooves in annular casting 50 and cover pieces 52, all in the manner described in Patent 2,865,165. Inwardly facing channels 44 are not hinged but move in unison with channels 42 since the channels are linked together by means of clips 54 and channels 44 are kept from longitudinal movement by means of rocker arms 56 to be described hereinafter. To prevent loss of thrust due to exhaust gases escaping laterally or radially from jet nozzle 40, sealing strips 58 are provided between adjacent interlocking channels 42 and 44 as shown in Figure 3.

Secured as by welding to the back or outside of each inwardly facing channel 44 is a bracket 60. Each of the brackets 60 is pivotally secured to the after end of a rocker arm 56 by means of a pin 62 passed through aligning bores in the bracket and the rocker arm. The rocker arms in turn are mounted to pivot about pins 64 in brackets 66 spaced equidistantly about the periphery of the end of tailpipe 28 and secured to annular casting 50 as by bolts 68. As best shown in Figure 3 the rocker arms 56 are substantially of channel shaped cross-section.

Figure 4:
Figures 4 and 5 illustrate the flaps of the variable shroud nozzle in open and closed positions, respectively.
Figure 5:
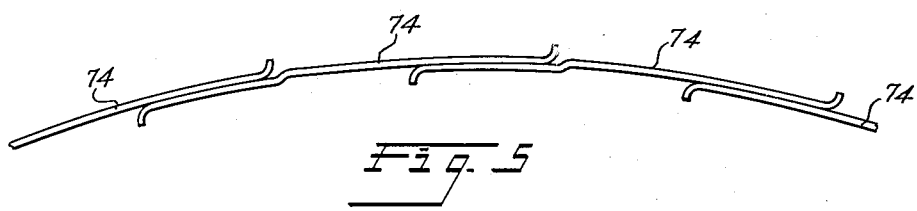
Figure 6:
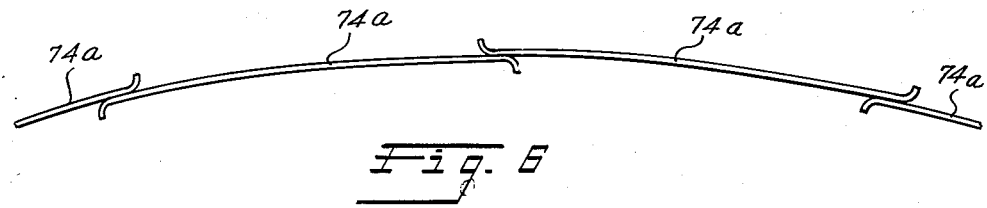
Figures 6 and 7 illustrate a modified form of the variable shroud nozzle flaps in open and closed positions, respectively.
Figure 7:

Mounted on the back of each rocker arm 56 are two U-shaped brackets 70 and 72 which are secured to, and support the flaps 74 forming the variable shroud nozzle generally indicated at 75. Flaps 74, like channels 42 and 44, are wider at their forward ends than at their after ends so that they may be swung inwardly or outwardly to respectively decrease or increase the size of the shroud nozzle orifice. Since each flap 74 is rigidly secured to a rocker arm 56, and through the rocker arms to channels 42 and 44, it will be apparent that the shroud flaps and jet nozzle channels will swing in or out in unison to simultaneously increase or decrease the orifices formed thereby. Flaps 74 are preferably formed as shown in the end elevations of Figures 4 and 5 which respectively show the flaps in open and closed positions. However, they may also be in the modified form 74a illustrated in Figures 6 and 7 with no sacrifice in operability or efficiency.

Figure 8:
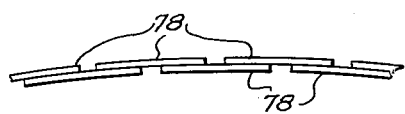
Figure 8 illustrates a modified form of transitional fairing between fuselage or nacelle and the variable shroud nozzle.

Flaps 74 are not hinged at their forward ends. At this point they closely abut a resilient annular ring 76 suitably secured to the after end of the aircraft fuselage 22 or engine nacelle as the case may be. Ring 76 may be of any suitable resilient material as for example neoprene, and also serves as fairing in the transition between fuselage or nacelle and shroud flaps 74. While a single resilient ring of some material such as neoprene is a preferred construction for the fairing element, it may also comprise two resilient overlapping spring steel strips 78 as shown in Figure 8 and described in detail in my copending application Serial No. 150,127. Strips 78 are mounted annularly on the after end of the fuselage or nacelle and serve very satisfactorily in operation.

The actuation or opening and closing of the variable jet nozzle 40 and variable shroud nozzle 75 is caused by the longitudinal or axial movement of the cooling shroud 80. Thus, each rocker arm 56 is provided at its forward end with a roller 82 which rides in the cam slots 84 of a substantially U-shaped camming element 86 rigidly secured to the after end of shroud 80. Elements 86 are secured to shroud 80 by welding and reinforced by an annular support member 88 as best shown in Figure 2. In the embodiment illustrated, roller 82 extends beyond each of the channel sides of rocker arm 56 and these extensions ride in cam slots 84 while the sides of the camming element 86 and sides of the rocker arm are separated by some means as washers 90 to prevent frictional losses.

In this manner, it will be seen that as shroud 80 is moved rearwardly rollers 82 will be forced up the inclined cam slots 84 and cause rocker arms 56 to pivot about their pivot points 64 in a clockwise direction simultaneously swinging channels 42 and 44 and shroud flaps 74 inwardly. When shroud 80 reaches the limit of its rearward movement rollers 82 will be at the top of cam slots 84 and the channels and shroud flaps will be in their fully closed positions as shown by the phantom lines in Figure 2. Forward movement of shroud assembly 80 to the limit of its forward movement will return rollers 82 to the bottom of cam slots 84 thereby swinging the channels 42 and 44 and shroud flaps 74 outwardly to their fully open positions, all as shown by solid lines in Figure 2.

As best seen from Figure 1 shroud 80 is hinged at its forward end to the tailpipe 28 by means of a plurality of hinges 92 of the type described in Patent 2,865,165. The shroud 80 is reciprocated in the axial direction by means of a fluid motor or actuator 94, although an electrical, servo or other type of motor can also be satisfactorily used. The piston rod 96 of motor 94 is extended and connected at its end to a yoke member 98 pivotally mounted on the afterburner assembly 20 as shown. The ends of yoke 98 are in turn connected by means of rods 100 to the shroud 80. The motor 94 is under control of a suitable control system (not shown) which may operate to give continuously variable control of the jet and shroud nozzles and may also be coordinated with the other after burner controls to simplify the job of the operator.

A further and presently preferred embodiment of the invention is shown in Figures 9 through 12. This embodiment of the invention is broadly similar to that described above in that it comprises an inner or outer jet nozzle including a number of interlocking inner and outer flaps or channel members 120 and 122, respectively, which may be identical to the channel members 42 and 44 described above and a shroud nozzle comprising a number of flaps 124 which are generally similar to flaps 74. The flaps 124 are outwardly flared as at 125 to provide smooth flow particularly in the closed position. As in the form of the invention disclosed in Figures 1 through 8 means is provided for opening and closing the inner and outer jet and shroud nozzles simultaneously.

However, in the modification of Figures 9 through 12 the actuating linkage is so arranged that a differential movement is established between corresponding flaps of the jet nozzle and the shroud nozzle during opening and closing movements. More specifically, during opening movement from the position shown in full lines to that shown in phantom lines in Figure 9, the inner and outer nozzle assemblies are moved relatively closer together so as to diminish the increase in the annular area between the two nozzles, and to prevent excessive outward movement of the shroud nozzle. During closing movement the converse is true.

Turning now more specifically to the structure of Figures 9 through 12, the inner outwardly facing jet nozzle channel members 120 are hinged to the tailpipe 28 by hinge pins 126 in the same manner as described above in connection with Figure 2. Secured to the outer side of each of the inwardly facing channels 122 is a bracket 128 having radially extending portions 130 provided with aligned slots 132. Extending through the slots 132 is a pin 134 which also extends through aligned bores in the rearward end of a rocker arm 136. The rocker arm 136 is of hollow light weight construction being formed of two mating stampings 138 and 140 joined as by welding at 142 along their outer longitudinal edges. Extending through the rocker arm 136 adjacent its midpoint is a sleeve 143 containing bushing bearing 144 pivotally supported on a pin 145 mounted on a bracket 146 secured to the tailpipe 28 as by bolts 148. As shown particularly in Figures 9 and 12 each rocker arm is provided at its forward end with a pin 150 which supports a roller 152 which rides in the cam slots 154 formed by complementary camming elements 156 and 158 the latter being rigidly secured to the annular extension 160 of the shroud 80. To provide a smooth external contour about the camming elements an annular sheet metal ring 162 is secured in place as shown outwardly of the camming elements. Suitable annular reenforcing members 164, 166 and 168 are provided to assure the necessary rigidity in the cam assembly.

The outer or shroud nozzle flaps 124 are connected as by bolts 174 to a bracket 176 which is in turn supported for pivotal movement on pin 145 independently of the rocker arms 136. This mounting disposes the forward edges of the flaps in yielding contact with the outer surface of the rocker arm. Secured as by welding to a sleeve 178 surrounding pin 134 are a pair of spaced members 180 together constituting a toggle arm indicated generally at 182. The outer or free end of the toggle arm 182 carries a pin 184 which passes through an inclined slot 186 in an actuating member 188 welded or otherwise suitably secured to the outer nozzle shroud flap members 124. The main body portion of member 188 as well as integral stiffening extensions 189 and 190 are received in and welded to a longitudinal dimple 191 in the flap members 124. Stiffeners 192 are welded to the opposite sides of the main body portion of member 188 and to the member 124. Intermediate its ends the toggle arm 182 carries a second pin 194 which passes though the outer end of an activating bar 196 which extends through an aperture 197 in the rocker arm 136, and is pivotally secured at its inner end to the tailpipe 28 by a pin 198.

It will be understood that additional assemblies identical to those shown in Figures 9 through 12 are arranged around the periphery of the tailpipe to provide continuous sealed inner and outer nozzles. In Figure 9 the shroud 80 is shown in its rearward position so that both the inner and outer flaps have been rotated to the full extent in the clockwise direction and thus occupy their fully closed positions. When the shroud 80 is moved to its forward position the rollers 152 will ride downwardly along the respective camming slots 154 rotating the rocker arms in a counterclockwise direction to the position shown in phantom lines in Figure 9. Counterclockwise motion of the rocker arm 136 produces corresponding counterclockwise or opening motion of the inner flap assemblies 120 and 122 in the same manner as in the apparatus of Figures 1 through 8, the pins 134 moving in the slots 132 to accommodate this motion.

As the rocker arm 136 is moved counterclockwise the toggle arms 82, which are pivotally mounted on pins 134, are carried bodily outwardly. As the arms are mounted outwardly their relative angle of inclination is changed due to the action of the activating bars 196 pivoting about an axis determined by the pins 198 which are spaced from the axis of pins 145 about which the pins 134 travel. Pins 184 at the outer or free end of the toggle arm 182 move the shroud flaps in a counterclockwise direction about the axis of pins 145, the pins 184 sliding along slots 186 during this motion. Because of the change in the inclination of the toggle arms 182 and the movement of their outer ends along slots 186 the outer shroud nozzle flaps 124 will be moved outwardly a lesser distance than the inner jet nozzle flaps. The inner and outer flap assemblies thus will be moved relatively closer together. By proper proportioning of the linkage assembly the degree of relative movement between the inner and the outer flap assemblies will be such that a substantial equality will be maintained between the pressure at the inner and outer sides of the trailing edge of the shroud nozzle flaps to minimize turbulence in this region.

It will be understood that by simple change in the length of the toggle arm or the activating arm, by relocation of their axes of movement, or by the substitution of a curved slot for that shown at 132 other differential motions may be produced to accommodate a number of varying operating requirements.

It will be understood from the foregoing that the invention provides an important and novel solution to the problem of obtaining practical and efficient nozzle control. By adapting the multi-flap operating principal to both the jet nozzle and shroud the problems encountered with the bulb or needle type variable nozzle are avoided, and at the same time the provision of a variable shroud nozzle operating in unison with the variable jet nozzle eliminates the problem of stagnation air areas between the shroud and nozzle that has heretofore been unavoidable when only the jet nozzle has been variable. In addition, the operation of the variable jet and shroud nozzles is simply and positively controlled by means requiring little upkeep and occupying relatively small space.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A variable area nozzle assembly for a jet engine, said nozzle assembly comprising a plurality of interconnected members forming a circular jet nozzle orifice, a variable area shroud nozzle comprising a plurality of coacting flap elements forming a second circular nozzle orifice surrounding said jet nozzle orifice, actuating means for said nozzles movable axially of said engine, and means operatively connecting said actuating means and each of said nozzles whereby axial movement of said actuating means is effective to simultaneously vary the sizes of said nozzle orifices, the shape of said orifices remaining substantially circular for all sizes thereof.

2. A variable area nozzle assembly for jet engines, said assembly comprising a plurality of members mounted for angular movement with respect to the axis of said assembly, portions of said members overlapping portions of adjacent members to form a first substantially continuous sealed orifice, a plurality of flap elements disposed in surrounding relation to said orifice and mounted for angular movement with respect to the axis of said assembly, portions of said flap elements overlapping portions of adjacent flap elements to form a second substantially continuous sealed orifice, actuating means for said members and said flap elements mounted for movement axially of said engine and means operative to translate axial movement of said actuating means into angular movement of said members and said flap elements whereby axial movement of said actuating means is effective to simultaneously vary the sizes of said orifices.

3. In a jet engine having a tailpipe through which reaction fluids flow, a substantially circular variable jet nozzle for controlling the flow of said reaction fluids, said jet nozzle comprising a plurality of elements movably mounted adjacent the end of the tailpipe, a second substantially circular variable nozzle, means mounting said second nozzle in surrounding substantially concentric relation with said jet nozzle, actuating means for said nozzles movable axially of said engine, and means operatively connecting said actuating means and each of said nozzles whereby axial movement of said actuating means is effective to simultaneously vary the diameters of said nozzles.

4. In an afterburner, a diffuser section, a burner section, a tailpipe, a variable substantially circular jet nozzle comprising a plurality of elements pivotally mounted on said tailpipe, a variable substantially circular shroud nozzle surrounding said jet nozzle and concentric therewith, and means to simultaneously vary the diameters of said nozzles.

5. In a jet engine afterburner, a diffuser section, a burner section, a tailpipe, a variable circular jet nozzle comprising a plurality of elements pivotally mounted on said tailpipe, a variable circular shroud nozzle surrounding said jet nozzle and operably connected thereto, and means to simultaneously vary the diameters of said nozzles, said nozzles remaining circular for all variations in size.

6. In a jet engine having a tailpipe, a variable area jet nozzle, a variable area shroud nozzle surrounding said jet nozzle to define a cooling air passage therebetween, each of said nozzles comprising a plurality of elements arranged for pivotal movement with respect to said tail pipe, and means movable axially of said tailpipe and operatively connected to each of said elements to simultaneously vary the radial position of said elements to thereby vary the areas of said variable area nozzles.

7. In a jet engine having a tailpipe through which reaction fluids flow, a pair of variable nozzles each forming a substantially circular orifice, means mounting at least one of said nozzles on said tailpipe to control the flow of said fluids, means mounting the other of said nozzles in surrounding radially spaced relation with said one of said nozzles, means for simultaneously varying the diameters of said orifices, and means for varying the radial distance between said orifices as the diameter of said orifices is varied.

8. In a jet engine having a tailpipe through which reaction fluids flow, a pair of substantially axially aligned concentric variable nozzles, each of said nozzles comprising a plurality of elements pivotally mounted on said tailpipe and forming substantially circular radially spaced orifices, and means for simultaneously pivoting each of said elements to vary the diameter of each of said orifices.

9. The combination according to claim 8 together with means to vary the radial distance between said orifices as the diameter of said orifices is varied.

10. In a reaction engine having a duct through which combustion products flow and a surrounding shroud, a variable jet nozzle mounted on said duct in axially fixed relation thereto, a variable shroud nozzle surrounding said jet nozzle in radially spaced relation therefrom to form an open passage herewith and forming a continuation of said shroud, and means to simultaneously vary the diameter of said nozzles.

11. In a jet engine afterburner having a tailpipe, a variable circular jet nozzle mounted on said tailpipe, a variable circular shroud nozzle surrounding said jet nozzle and operably connected thereto, each of said nozzles comprising a plurality of radially movable elements, and means to simultaneously vary the radial position of said elements to thereby vary the diameters of said nozzles, said nozzles remaining circular for all variations in size.

12. In a jet engine having a tailpipe, a shroud member surrounding said tailpipe and mounted for longitudinal movement with respect thereto, a variable jet nozzle mounted on said tailpipe, a variable shroud nozzle surrounding said jet nozzle and operably engaged therewith, and means responsive to the longitudinal movement of said shroud member to simultaneously increase or decrease the sizes of said nozzles.

13. A device as defined in claim 12, wherein said nozzles are circular in shape for any size thereof.

14. In a jet engine afterburner, an afterburner tailpipe, a movable shroud surrounding said tailpipe to define a cooling air passage around said tailpipe, a variable area jet nozzle mounted on said tailpipe, a variable area shroud nozzle surrounding said jet nozzle and concentric therewith, means operably connecting said jet nozzle and said shroud nozzle, and means on said movable shroud to coact with said last-named means to simultaneously vary the sizes of said nozzles.

15. In a jet engine, a tailpipe, a reciprocable shroud member surrounding said tailpipe, a variable jet nozzle forming a circular nozzle orifice mounted on said tailpipe in substantially axially fixed relation thereto, a variable shroud nozzle forming a circular nozzle orifice surrounding said jet nozzle, means operably connecting said jet nozzle and shroud nozzle, means on said shroud member coacting with said last-named means to vary the size of said nozzle orifices as said shroud member is reciprocated, and means to reciprocate said shroud member.

16. A device as defined in claim 14, wherein the shape of said jet nozzle and shroud nozzle remains circular for any size of the nozzles.

17. In a jet engine, a tailpipe, a movable shroud surrounding said tailpipe, a first variable area nozzle hinged to said tailpipe comprising a plurality of interconnecting channel members forming a circular nozzle orifice, a second variable area nozzle surrounding said first nozzle comprising a plurality of coacting flap elements forming a circular nozzle orifice, means operably connecting said first and second nozzles, and means on said shroud to swing said channel members and said flaps towards the center of said nozzles to simultaneously decrease the size of said nozzle orifices and to swing said channel members and said flaps away from the center of said nozzles to simultaneously increase the size of said nozzle orifices.

18. A device as defined in claim 17, where said nozzle orifices remain circular for any size thereof.

19. In a jet engine mounted in an engine housing, an afterburner tailpipe, a movable shroud surrounding said tailpipe and concentric therewith, a variable area jet nozzle mounted on said tailpipe comprising a plurality of interlocked alternately arranged inwardly facing and outwardly facing channels forming a circular nozzle orifice, a variable area shroud nozzle surrounding and concentric with said jet nozzle comprising a plurality of coacting flap elements forming a circular nozzle orifice, a plurality of rocker arms rigidly connecting said flap elements to said inwardly facing channels, means on said shroud coacting with means on said rocker arms to rock said arms when said shroud is moved thereby actuating said channels and flaps simultaneously to increase or decrease the size of the orifices formed thereby, and a motor responsive to control signals to move said shroud.

20. An engine as defined in claim 19, wherein said shroud is hinged at its forward end to said tailpipe for longitudinal movement with respect thereto.

21. A device as defined in claim 19, wherein said channels and flaps are wider at their forward ends than at their after ends so that they may be simultaneously moved inwardly or outwardly, the shape of the orifices formed thereby remaining circular at all times.

22. A device as defined in claim 19, wherein said flaps abut an annular resilient ring secured to said engine housing.

23. A device as defined in claim 19, wherein said means on said shroud coacting with means on said rocker arms are a plurality of cam tracks.

24. A device as defined in claim 23, wherein said means on said rocker arms are rollers riding in said cam tracks.

25. A device as defined in claim 19, wherein said motor is operably secured to said shroud through a yoke member pivotably mounted on said tailpipe.

References Cited in the file of this patent

UNITED STATES PATENTS

| | | |
|---|---|---|
| 2,501,633 | Price | March 21, 1950 |
| 2,557,435 | Imbert | June 19, 1951 |
| 2,575,735 | Servanty | Nov. 20, 1951 |
| 2,597,253 | Melchior | May 20, 1952 |
| 2,637,163 | Brown et al. | May 5, 1953 |

FOREIGN PATENTS

| | | |
|---|---|---|
| 586,571 | Hall et al. | March 24, 1947 |